United States Patent
Kryloff

(10) Patent No.: US 6,289,509 B1
(45) Date of Patent: Sep. 11, 2001

(54) SOFTWARE PATCH GENERATOR

(75) Inventor: Sergey A. Kryloff, Saint Petersburg (RU)

(73) Assignee: PKWare, Inc., Brown Deer, WI (US)

( * ) Notice: Subject to any disclaimer, the term of this patent is extended or adjusted under 35 U.S.C. 154(b) by 0 days.

(21) Appl. No.: 09/144,666

(22) Filed: Sep. 1, 1998

(51) Int. Cl.[7] ................................................ G06F 9/445
(52) U.S. Cl. ................................................................ 717/11
(58) Field of Search ..................................... 395/712, 709, 395/701; 341/50; 364/200; 707/203; 709/221; 711/102; 712/300; 717/11, 9, 1

(56) References Cited

U.S. PATENT DOCUMENTS

| | | | | |
|---|---|---|---|---|
| 4,939,639 | * | 7/1990 | Lee et al. | 707/7 |
| 5,218,700 | * | 6/1993 | Beechick | 712/300 |
| 5,270,712 | * | 12/1993 | Iyer et al. | 341/50 |
| 5,699,275 | * | 12/1997 | Beasley et al. | 709/221 |
| 5,802,549 | * | 9/1998 | Goyal et al. | 711/102 |
| 5,832,273 | * | 11/1998 | Mizuse | 717/9 |
| 5,832,520 | * | 11/1998 | Miller | 707/203 |
| 5,937,188 | * | 8/1999 | Freeman | 717/1 |

* cited by examiner

Primary Examiner—Mark Powell
Assistant Examiner—Hoang-Vu Antony Nguyen-Ba
(74) Attorney, Agent, or Firm—Godfrey & Kahn, S.C.

(57) ABSTRACT

A system for generating a patch file from an old version of computer code which consists of a series of elements and a new version of computer code which also consists of a series of elements. Both the old and new versions of computer code are stored in a memory of a computer. An alphabet for processing the old and new versions of computer code is programmed into the computer and, once established, the old version of computer code is sorted with the data processor alphabetically according to the established alphabet to create a first sorted list of code. A pointer is maintained in order to indicate each element's original location in the old version of computer code. Similarly, the new version of computer code is also sorted alphabetically to create a second sorted list of code with a pointer of each element to indicate the element's original location in the new version of computer code. Once the two sorted lists are created, they are recursively compared one word (a group of elements) at a time to search for a match of the codes. Upon finding a match of the codes, the first and second sorted lists of code are searched to find the largest sequence of coinciding elements preceding and succeeding the match of the codes. Each sequence of coinciding words is then stored in a coincidences list. The coincidences list is processed to remove duplicative information and a patch file is created from the processed coincidences list.

5 Claims, 8 Drawing Sheets

First Sorted List of Code:

| Line Number | Word | Offset ($P_{1st}$) |
|---|---|---|
| 1 | ABB | 7 |
| 2 | ABB | 16 |
| 3 | ABC | 1 |
| 4 | ABD | 4 |
| 5 | ACD | 10 |
| 6 | BAB | 15 |
| 7 | BAC | 9 |
| 8 | BBA | 8 |
| 9 | BBD | 17 |
| 10 | BCA | 2 |
| 11 | BDA | 5 |
| 12 | CAB | 3 |
| 13 | CBA | 14 |
| 14 | CDD | 11 |
| 15 | DAB | 6 |
| 16 | DCB | 13 |
| 17 | DDC | 12 |

Second Sorted List of Code:

| Word | Offset ($P_{2nd}$) |
|---|---|
| ABD | 4 |
| ADC | 16 |
| ADD | 7 |
| BAD | 15 |
| BBB | 10 |
| BBD | 11 |
| BCA | 2 |
| BDA | 5 |
| BDC | 12 |
| CAB | 3 |
| CBA | 14 |
| DAD | 6 |
| DBB | 9 |
| DBC | 1 |
| DCB | 13 |
| DCD | 17 |
| DDB | 8 |

| Current Line Number in First List | Current Line Number in Second List | Relation Between Current Words ("<", ">" or "=") |
|---|---|---|
| 1 | 1 | < |
| 2 | 1 | < |
| 3 | 1 | < |
| 4 | 1 | = (ABD) |
| 5 | 2 | < |
| 6 | 2 | > |
| 6 | 3 | > |
| 6 | 4 | < |
| 7 | 4 | < |
| 8 | 4 | > |
| 8 | 5 | < |
| 9 | 5 | > |
| 9 | 6 | = (BBD) |
| 10 | 7 | = (BCA) |
| 11 | 8 | = (BDA) |
| 12 | 9 | > |
| 12 | 10 | = (CAB) |
| 13 | 11 | = (CBA) |
| 14 | 12 | < |
| 15 | 12 | < |
| 16 | 12 | > |
| 16 | 13 | > |
| 16 | 14 | > |
| 16 | 15 | = (DCB) |
| 17 | 16 | > |
| 17 | 17 | > |

| Word | ABD | BBD | BCA | BDA | CAB | CBA | DCB |
|---|---|---|---|---|---|---|---|
| Max Coincidence Block Length | * | 3 | 6 | * | * | * | 4 |
| Old File Offset | * | 17 | 2 | * | * | * | 13 |
| New File Offset | * | 11 | 2 | * | * | * | 13 |

|   | First List<br>(Old Version<br>of Computer<br>Code): | | | Second List<br>(New Version<br>of Computer<br>Code): | |
|---|---|---|---|---|---|
|   | Word | Position | | Word | Position |
| 50 | ABC | 1 | 52 | DBC | 1 |
|   | BCA | 2 | | BCA | 2 |
|   | CAB | 3 | | CAB | 3 |
|   | ABD | 4 | | ABD | 4 |
|   | BDA | 5 | | BDA | 5 |
|   | DAB | 6 | | DAD | 6 |
|   | ABB | 7 | | ADD | 7 |
|   | BBA | 8 | | DDB | 8 |
|   | BAC | 9 | | DBB | 9 |
|   | ACD | 10 | | BBB | 10 |
|   | CDD | 11 | | BBD | 11 |
|   | DDC | 12 | | BDC | 12 |
|   | DCB | 13 | | DCB | 13 |
|   | CBA | 14 | | CBA | 14 |
|   | BAB | 15 | | BAD | 15 |
|   | ABB | 16 | | ADC | 16 |
|   | BBD | 17 | | DCD | 17 |

FIG. 5

| Line Number | First Sorted List of Code: Word | Offset ($P_{1st}$) | Second Sorted List of Code: Word | Offset ($P_{2nd}$) |
|---|---|---|---|---|
| 1 | ABB | 7 | ABD | 4 |
| 2 | ABB | 16 | ADC | 16 |
| 3 | ABC | 1 | ADD | 7 |
| 4 | ABD | 4 | BAD | 15 |
| 5 | ACD | 10 | BBB | 10 |
| 6 | BAB | 15 | BBD | 11 |
| 7 | BAC | 9 | BCA | 2 |
| 8 | BBA | 8 | BDA | 5 |
| 9 | BBD | 17 | BDC | 12 |
| 10 | BCA | 2 | CAB | 3 |
| 11 | BDA | 5 | CBA | 14 |
| 12 | CAB | 3 | DAD | 6 |
| 13 | CBA | 14 | DBB | 9 |
| 14 | CDD | 11 | DBC | 1 |
| 15 | DAB | 6 | DCB | 13 |
| 16 | DCB | 13 | DCD | 17 |
| 17 | DDC | 12 | DDB | 8 |

The first list is braced as 55, the second as 57.

FIG. 6

| Current Line Number in First List | Current Line Number in Second List | Relation Between Current Words ("<", ">" or "=") |
| --- | --- | --- |
| 1 | 1 | < |
| 2 | 1 | < |
| 3 | 1 | < |
| 4 | 1 | = (ABD) |
| 5 | 2 | < |
| 6 | 2 | > |
| 6 | 3 | > |
| 6 | 4 | < |
| 7 | 4 | < |
| 8 | 4 | > |
| 8 | 5 | < |
| 9 | 5 | > |
| 9 | 6 | = (BBD) |
| 10 | 7 | = (BCA) |
| 11 | 8 | = (BDA) |
| 12 | 9 | > |
| 12 | 10 | = (CAB) |
| 13 | 11 | = (CBA) |
| 14 | 12 | < |
| 15 | 12 | < |
| 16 | 12 | > |
| 16 | 13 | > |
| 16 | 14 | > |
| 16 | 15 | = (DCB) |
| 17 | 16 | > |
| 17 | 17 | > |

FIG. 7

| Word | ABD | BBD | BCA | BDA | CAB | CBA | DCB |
|---|---|---|---|---|---|---|---|
| Max Coincidence Block Length | * | 3 | 6 | * | * | * | 4 |
| Old File Offset | * | 17 | 2 | * | * | * | 13 |
| New File Offset | * | 11 | 2 | * | * | * | 13 |

| Max Coincidence Block Length | 3 | 6 | 4 |
|---|---|---|---|
| Old File Offset | 17 | 2 | 13 |
| New File Offset | 11 | 2 | 13 |

| Max Coincidence Block Length | 6 | 3 | 4 |
|---|---|---|---|
| Old File Offset | 2 | 17 | 13 |
| New File Offset | 2 | 11 | 13 |

| End of Block + 1 in the New File | 8 | 14 | 17 |
|---|---|---|---|

SOFTWARE PATCH GENERATOR

FIELD OF THE INVENTION

The present invention relates to methods and systems used to provide software support. In particular, the present invention relates to a method and system for upgrading software used by a software vendor's customers.

BACKGROUND OF THE INVENTION

Software vendors are continually fixing, modifying, and enhancing the computer programs supplied to their customers. Typically, such changes are in response to bugs found in the programs, to the need for improved or more features, or a combination of both. In the past and still today, the predominant method of updating software and providing fixes is to supply customers a disc (e.g., floppy or CD-ROM) containing a complete new version of the program. Upon receipt of the upgrade disc, the customer installs the new version of the software on his or her computer. The installation process generally results in the old version of the program being overwritten with the new version.

There are several problems with this method of supplying upgrades. First, it generally takes a relatively large amount of time to produce sufficient quantities of discs for distribution to customers. Accordingly, such discs are released only once or twice a year. This reduces the speed at which customers can be supplied with fixes to their programs and may force them to operate the software with errors or other bugs for several months. Second, physical discs are expensive to create and deliver.

Thus, there have been some attempts to deliver upgrades via communication networks such as the Internet or by direct connection using modems. However, even with ever improving transmission capacity and reliability, transmission of large upgrade files can be difficult and time consuming to complete. In response to the difficulties of transmitting large complete files, patch technology has been developed that permits the transmission of smaller, partial programs. In many instances, only certain parts or files need to be repaired or updated in order to update a computer program. Therefore, only a partial or "patch" file needs to be transmitted to the end user. Generally, small files may be transmitted faster and more reliably than larger files. However, existing patch technology is unacceptable when anything more than minor changes need to be delivered to a customer. Accordingly, there is a need for an improved method and system of upgrading software using patches. More specifically, there is a need for an improved system and method of generating a patch file.

OBJECT AND SUMMARY OF THE INVENTION

Therefore, it is an object of the present invention to provide an improved method and system of upgrading software.

It is another object of the present invention to provide a software patch generator that efficiently produces patches of relatively small size.

These and other objects are achieved in a system for generating a patch file from an old version of computer code which consists of a series of elements and a new version of computer code which also consists of a series of elements. Both the old and new versions of computer code are stored in a memory of a computer, such as a server, in the system. The old and new versions of computer code are accessible by a data processor of the computer.

An alphabet for processing the old and new versions of computer code is first programmed into the computer. The alphabet consists of words of a desired size. Thus, for example, all sequences of three elements in each of the old and new versions of computer code may be treated as a single word.

Once the alphabet is established, the old version of computer code is sorted with the data processor alphabetically according to the established alphabet to create a first sorted list of code. A pointer is maintained in the first sorted list of code in order to indicate each element's original location in the old version of computer code. Similarly, the new version of computer code is also sorted alphabetically to create a second sorted list of code with a pointer of each element to indicate the element's original location in the new version of computer code. Once the two sorted lists are created, they are recursively compared one word at a time to search for a match of the codes. Upon finding a match of the codes, the first and second sorted lists of code are searched to find the largest sequence of coinciding elements preceding and succeeding the match of the codes. Each sequence of coinciding words is then stored in a coincidences list. The coincidences list is then processed to remove duplicative information. Finally, a patch file is created from the processed coincidences list.

The process of creating a patch file from the processed coincidences list includes the steps of (a) finding a largest block of coinciding elements of the processed coincidences list that matches the second sorted list of code and recording the location of the largest found segment in memory; (b) in the area before the previously found segment, finding the next largest block of coinciding elements of the processed coincidences list that matches the second sorted list of code and recording the location of the next largest segment in memory; (c) repeating step (b) until (1) the first member of the processed list of coincidences is reached, or (2) there are no matches between the second sorted list of code and the processed coincidences list; (d) writing a "write from the old version of computer code" command and offset and length information to the patch file if the first member of the processed list of coincidences is reached; and (e) writing a "write from patch file" command and length and patch information to the patch file if there are no matches between the second sorted list of code and the processed list of coincidences.

These are just some of the features and advantages of the present invention. Many others will become apparent by reference to the detailed description of the invention taken in combination with the accompanying drawings.

BRIEF DESCRIPTION OF THE DRAWINGS

In the drawings:

FIG. 5 is a diagram showing the old and new versions of the computer code organized into a list of alphabetical words (each word consisting of three symbols).

FIG. 6 is a diagram showing the old and new versions of computer code sorted alphabetically in a list of three-symbol words.

FIG. 7 is a diagram illustrating the methodology for finding coincidences in the two sorted lists of computer code shown in FIG. 6.

FIG. 8 is a diagram of the list of coinciding words in the two sorted lists of code.

FIG. 9 is a list of coincidences where duplicative information has been removed.

FIG. 10 is a list of sorted non-duplicative coincidences.

FIG. 11 is a list of end block values.

DETAILED DESCRIPTION

Figure 1:
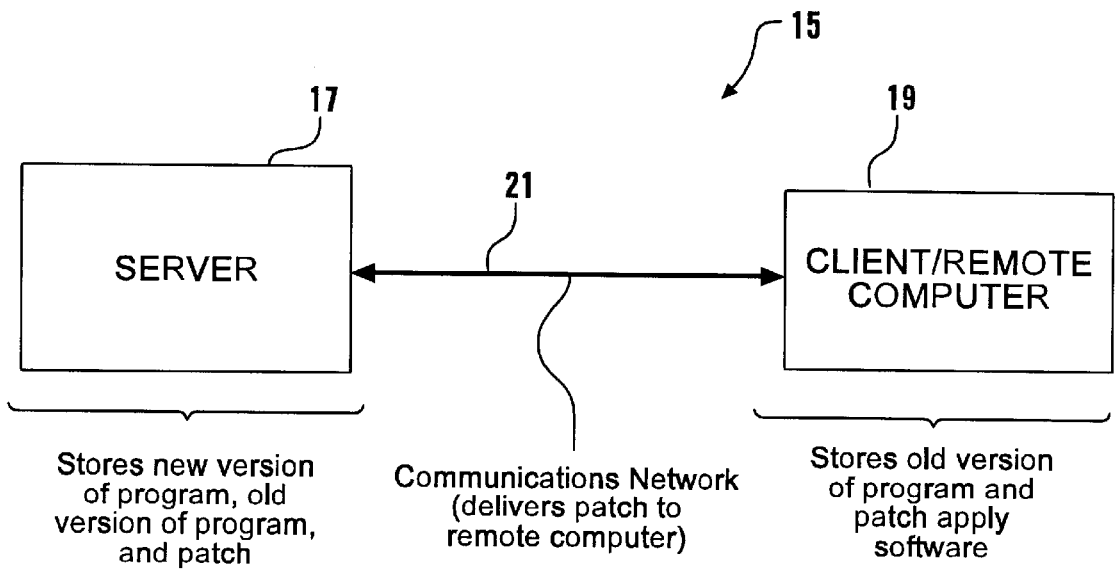
FIG. 1 is a schematic diagram of a server or host computer connected to a client or remote computer via a communications network.

A server-client computer system 15 is shown schematically in FIG. 1. The system 15 includes a server (or main computer) 17. The server 17 is coupled to a remote or client computer 19. The server 17 and client 19 are coupled to each other via a communications network 21, which can be any available network, from a LAN (local area network) to the Internet. It should be understood that the present invention is intended to be implemented using presently existing and well-known computer hardware and communications technology. Of course, the inventor(s) envision(s) that the invention may also be implemented with equipment and technology not yet commercially available.

Figure 2:
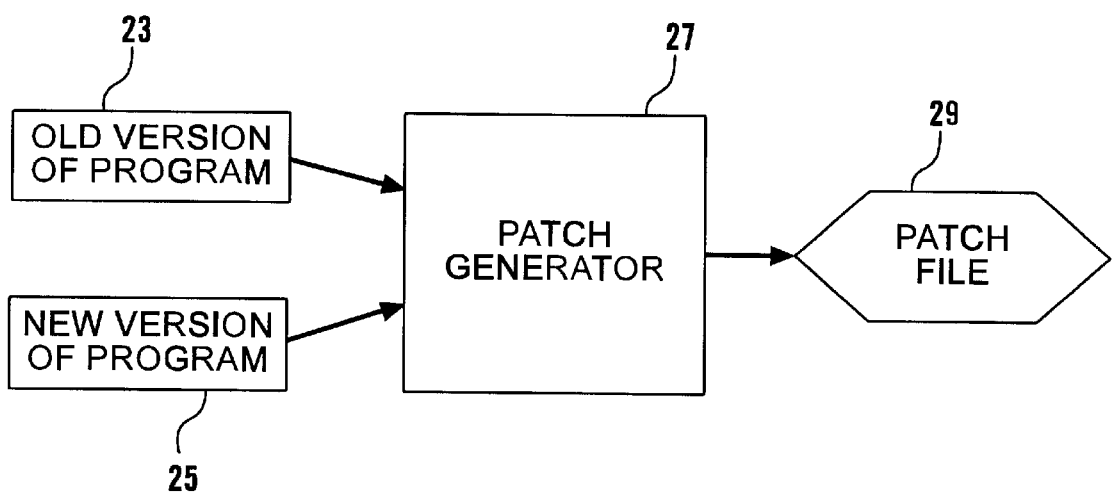
FIG. 2 is a schematic diagram illustrating the process of creating a patch file.

The general process of creating a patch file is shown in FIG. 2. An old version 23 of a computer program (FIG. 2) and a new version 25 of a computer program are fed to a patch generator 27. The patch generator 27 creates a patch file 29. The patch file 29 may be transmitted over a communications network such as the communications network 21 to a client such as the client 19. The client, on which a copy of the old version 23 of a computer program and a patch installer have been loaded, receives the patch file 29. Using the patch file 29, patch installer, and the copy of the old version 23 of a computer program, the client creates a copy of the new version 25 of a computer program. This process, at least in general terms, is known.

As more readily seen by reference to FIG. 3, in the present invention the server 17 has a processing unit 32, input and output devices 34, a memory 36 storing an old version 38 of computer code, a new version 39 of computer code, and a patch generator 40 which is used to create a patch file (discussed below).

Figure 4:
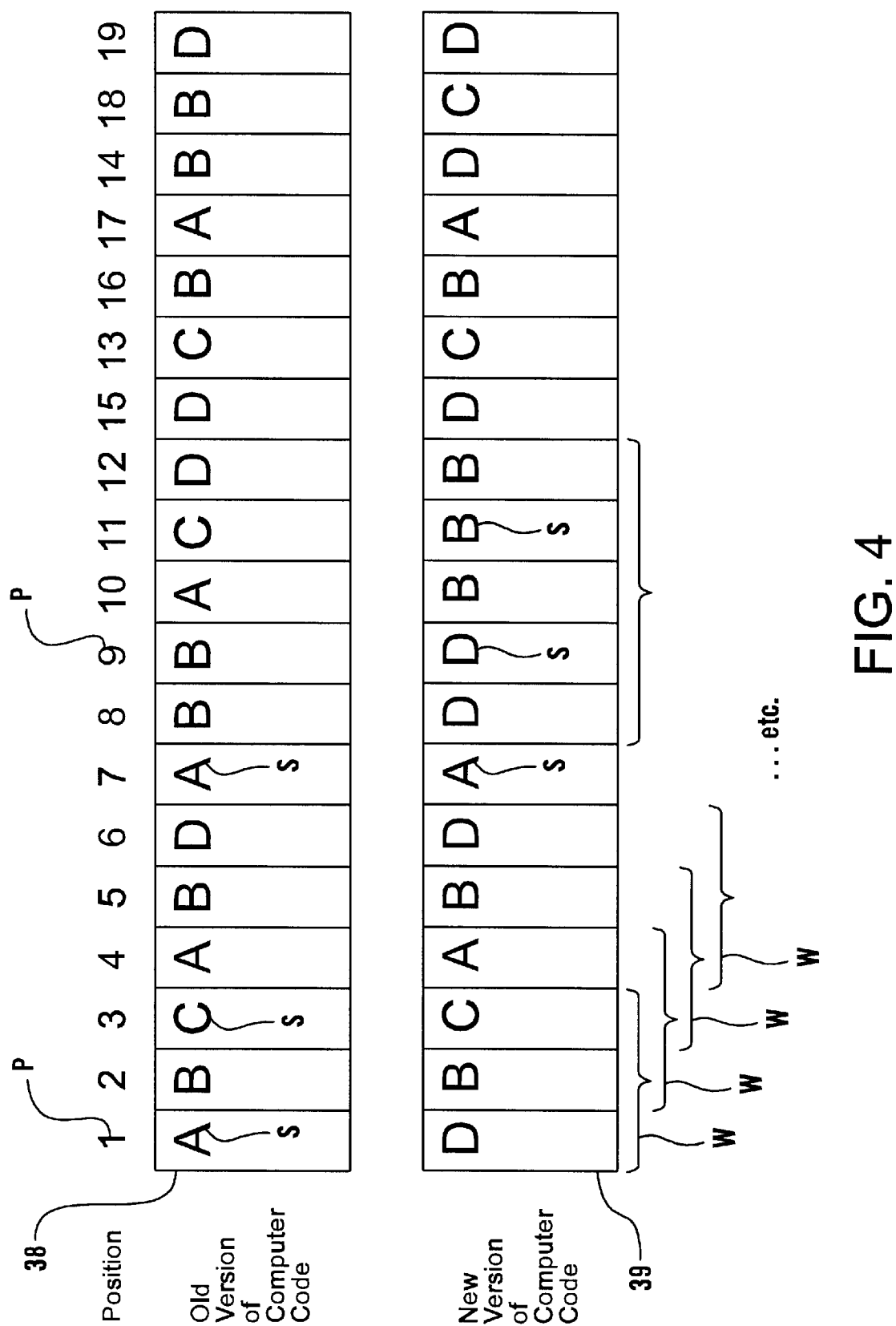
FIG. 4 is a schematic diagram of two exemplary files, an old version of computer code, and a new version of computer code.

As best seen by reference to FIG. 4, the old version 38 of computer code may be illustrated as a series of elements or symbols S (which, for the example shown, are English alphabetic symbols, but in actual files the elements would be bits of information, i.e., "1s and 0s"). Each symbol S has a position P in the computer codes 38 and 39 indicated by the numbers 1–19. In actual files, each position P is an offset (in bytes) based on a single byte (the very left byte in a file is the first position). Using the symbols S, an alphabet is developed where a series of symbols makes up a single word W. For purposes of explanation, three sequential symbols are considered to be a single word, although the number of symbols in a word can be changed. As will be better understood after further explanation below, the choice of word size affects the time it takes to generate a patch file as well as the size of the patch file. Using large words, patch files may be generated very quickly, but the resulting size of such files is relatively large. Using small words, patch files are generated relatively slowly, but are small in size.

It is presently thought that all sequences of 12 bytes following each other in a file should be treated as a single word in order to optimize time and size considerations. However, for purposes of discussion, the invention will be described with three-symbol words. By way of example, with three consecutive elements or symbols as a word, an initial sequence of "ABCDEF" yields four words W, namely: "ABC," "BCD" (not "DEF"), "CDE," and "DEF." The words W are determined using a sliding window of length 3, moving it to the right, one symbol at a time, through the sequence of symbols.

FIG. 4 also illustrates a series of symbols that represent the new version of computer code. (For the sake of simplicity, the old and new versions 38 and 39 of computer code are the same length, but usually this is not the case, and it makes no difference whether it is or is not the case.) To create a patch file (discussed below), the patch generator 40 first processes the old and new versions 38 and 39 of computer code into lists of three-symbol words as shown in FIG. 5; a first list 50 of words and a second list 52 of words. Next, the first list 50 of words (old version 38 of computer code) is sorted alphabetically. Specifically, the first list 50 is sorted using the server 17 according to the established alphabet to create a first sorted list 55 of code with a pointer or offset $P_{1st}$ (FIG. 5) indicating the original location of each sorted word W in the old version 38 of computer code. The second list 52 of words (new version 29 of computer code) is similarly sorted to create a second sorted list 57 of code with a pointer or offset $P_{2nd}$.

As best seen by reference to FIG. 7, once the first and second sorted lists 55 and 57 of code are generated, the patch generator 40 searches through each of the sorted lists recursively, comparing the first and second sorted lists of code one word at a time for a match of the codes. In particular, if the first word in the first sorted list 55 is less than (alphabetically) the first word in the second sorted list 57, then the next word in the first sorted list is compared to the first word in the second sorted list. However, if the selected word in the first sorted list 55 is greater than the selected word in the second sorted list 57, then the next word in the second sorted list is compared to the selected word in the first sorted list.

If a match or coincidence in the first and second sorted lists 55 and 57 of code is found, the coincidence is stored in a list of coincidences 60 (FIG. 8). Upon finding a coincidence, the patch generator 40 also searches the first and second sorted lists of code to find the largest sequence of coinciding symbols S preceding and succeeding the initial coincidence and this block of coinciding symbols is recorded in the list of coincidences 60. The list of coincidences 60 is then processed to remove duplicative coincidences or, more generally, duplicative information, indicated in the list by asterisks. The removal of duplicative information results in the creation of a refined list of coincidences 65 (FIG. 9). In short, if two equivalent words W are found (i.e., a coincidence) and the symbols preceding the coincidence in the first and second sorted lists of code 55 and 57 are the same, the coincidence is considered to contain duplicative information, and thus not included in the refined list of coincidences 65.

Once the refined list of coincidences 65 is generated, additional information is obtained by sorting the refined list of coincidences 65 by the offset or position in the new version of computer code of each non-duplicative coincidence, resulting in a sorted list of coincidences 70 (FIG. 10). By adding the position or offset of each coincidence in the new version 39 of computer code to the maximum coincidence length (measured in the number of elements or symbols S) an end block list 75 (FIG. 11) is obtained which provides a means of calculating the intersections between the elements or symbols of the new version of computer code 39 and the refined list of coincidences 65.

Figure 3:
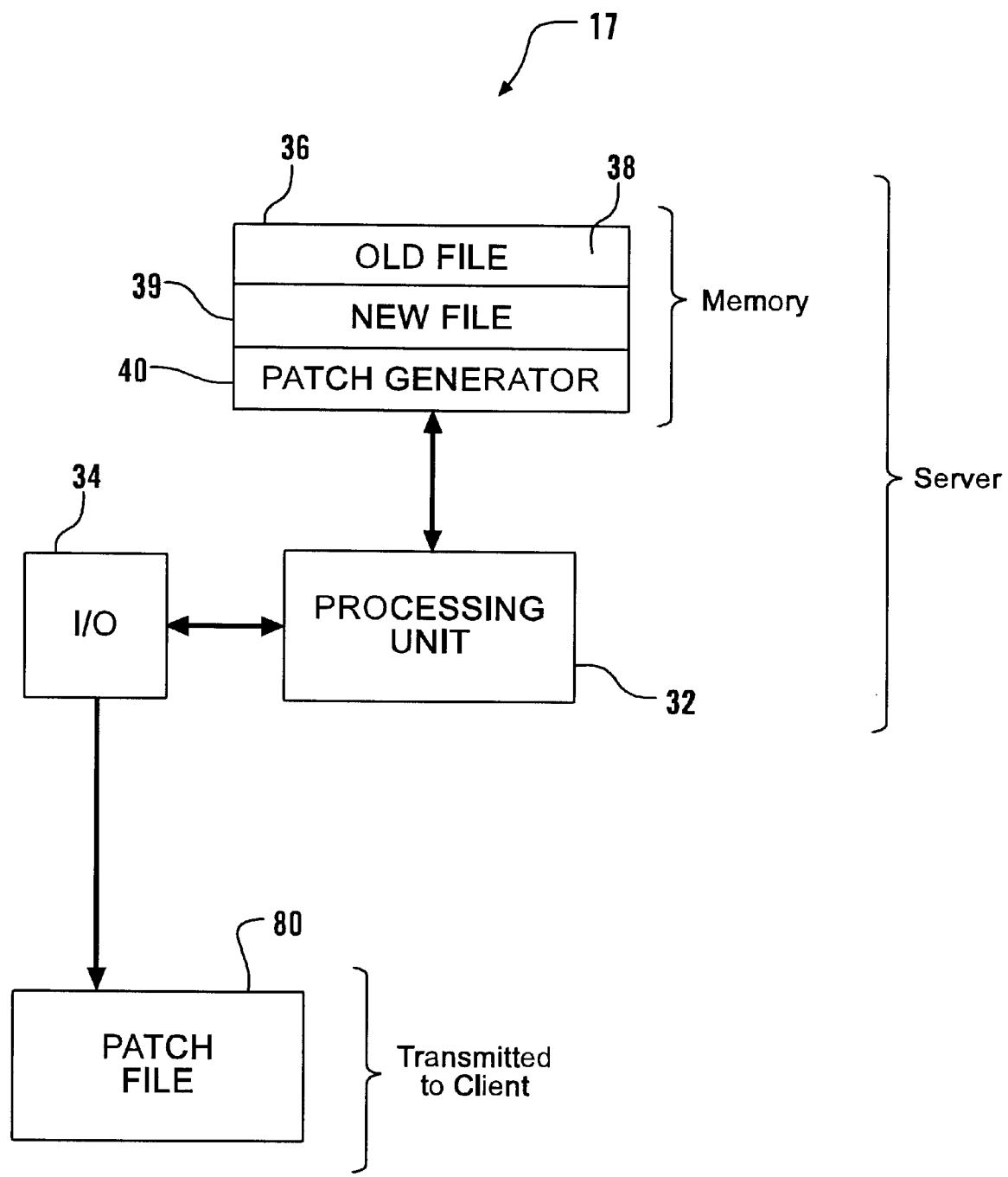
FIG. 3 is a more detailed schematic diagram of the server shown in FIG. 1.

Having generated the sorted list of coincidences 70 and end block list 75, the patch generator 40 can now generate a patch file 80 (FIG. 3). In the present invention the patch file 80 is generated recursively based on the contents of the new version 39 of computer code. The patch generating algorithm is described below.

The patch generating algorithm may be incorporated into a procedure, which for purposes hereof may be called "BuildPatch." The procedure call BuildPatch (m, n) is made where m and n are parameters representing the starting and the ending offsets in the new version 39 of computer code, respectively. If m>n, then the BuildPatch procedure terminates. If m<=n, then the procedure searches for the largest coincidence or block of symbols of the maximum length within the segment range (m, n) using the sorted list of coincidences 70. More specifically, the BuildPatch procedure searches for a block of symbols in the new version of computer code 39 having a starting position i and an ending position j such that m<=i<=j<=n. If such a block of symbols does not exist in the sorted list of coincidences 70, the BuildPatch procedure writes the contents of the (m, n) segment or block of symbols directly into the patch file 80 and subsequently terminates. If such a block is found, the BuildPatch procedure proceeds as follows:

(1) call BuildPatch (m , i–1);

(2) replace the (i, j) block with a corresponding reference to the old version 38 of computer code. More specifically, the procedure writes a "write from the old file" ("WFOF") command in the patch file 80 which indicates the data from the old version 38 of computer code to be used, by means of its offset or location and length within the old version. Then, 3) call BuildPatch (j+1, n).

Considering the specific example in FIGS. 4–11, the first step in the process is to call BuildPatch (1, 19). BuildPatch then searches for the block of symbols of maximum length by scanning the sorted list of coincidences 70, which for the exemplary files given herein is the block containing the word BCA with offsets in both the old and new versions 38 and 39 of code from the $2^{nd}$ to the $7^{th}$ position P. BuildPatch then calls itself: BuildPatch (1, 1). BuildPatch (1, 1) takes the $1^{st}$ block and calculates its intersection with the parameters m and n. The length of this intersection is zero (2>1). Of course, there is also a zero length intersection when the (1, 1) block is intersected with the remaining blocks of symbols: (11>1, 13>1). Finally, BuildPatch (1, 1) writes a "write from the patch file" ("WFPF") command along with the (1, 1) block of the new version 39 of computer code into the patch file 80, since there are no common blocks with the old version 38 of computer code within the range (1,1) of the new version. BuildPatch (1, 1) then terminates.

Although the BuildPatch (1,1) call has terminated, the BuildPatch (1, 19) call has not and continues the operation according to the basic process set out above. Since the (2, 7) block of symbols in the new version 39 of computer code coincides with the (2, 7) block of symbols from the old version 38 of computer code, the call results in a WFOF command with the offsets for the (2,7) block of the old version being written into the patch file 80. Subsequently, BuildPatch (8, 19) is called.

BuildPatch (8, 19) projects the sorted list of coincidences 70 onto the block (8, 19) of the new version 39 of computer code. This projection yields the following:

| Max Coincidence Block Length | 3(BCD) | 4(DCBA) |
|---|---|---|
| Old File Offset | 17 | 13 |
| New File Offset | 11 | 13 |

The (13, 16) block (which includes the symbols DCB) is the largest block, having a four-symbol length in the (8, 19) block. Following the process noted, the BuildPatch procedure then calls BuildPatch (8, 12). BuildPatch (8, 12) projects the sorted list of coincidences 70 onto the block (8, 12) of the new version 39 of computer code, which yields the following:

| Max Coincidence Block Length | 2 (not 3!) |
|---|---|
| Old File Offset | 17 |
| New File Offset | 11 |

Bear in mind the projection is limited to the (8, 12) block of the new version 39 and, thus, it is not possible to find the 3 symbol coincidence BBD which exists in the block (8, 13). Since the last coincidence was found, BuildPatch calls BuildPatch (8, 10). BuildPatch (8, 10) writes the block of symbols (8, 10) into the patch file 80 and returns control of the program to the up-calling procedure, BuildPatch (8, 12).

Figure 12:
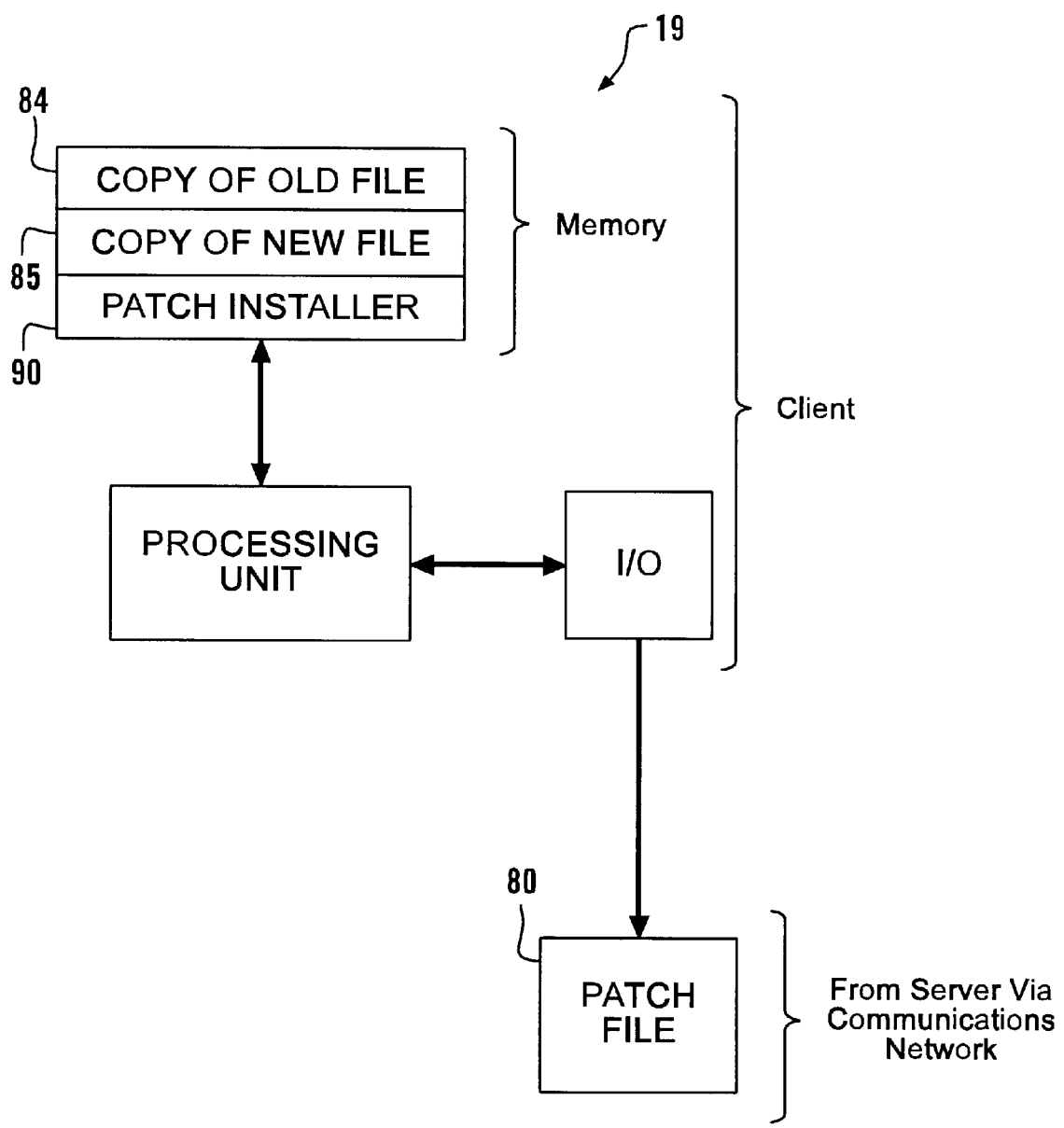
FIG. 12 is a more detailed schematic diagram of the client shown in FIG. 1.

The BuildPatch (8, 12) call results in a WFOF command with the offsets for the (17, 18) block of the old version 38 of computer code being written into the patch file 80. The symbols in the (17, 18) block will be written into the (11, 12) block of the new copy of the new version 85 of computer code generated in the client 19 (see FIG. 12). Then, BuildPatch (8, 12) calls BuildPatch (13, 12). BuildPatch (13, 12) does nothing and immediately terminates. BuildPatch (8, 19) then writes a WFOF command into the patch file 80 with directions to write the symbols in the (13, 16) block of the old version 38 of computer code into the (13, 16) block of the new copy of the new version 85 of computer code. BuildPatch (8, 19) then calls BuildPatch (17, 19). BuildPatch (17, 19) writes the (17, 19) block of code symbols in the patch file 80 and terminates. Then BuildPatch (8, 19) terminates. Finally, BuildPatch (1, 19) terminates too. Following through the above process, the file structure of the patch file 80 is as follows: [WFPF "D"; WFOF block (2, 7); WFPF "DDB"; WFOF block (17, 18); WFOF block (13, 16); WFPF "DCD"; end-of-patch command].

The patch file 80 is combined with a copy of the old version 84 of the computer code on the client 19 (FIG. 12) to create a new copy 85 of the new version 25 of the subject computer program using a patch installer 90. Since the patch file 80 is, in fact, the same as the new version 25 of the computer program, but with all the coincidences replaced with corresponding references to the old version of a computer program, the patch installer 90 is a rather simple program and writing such a program would be within the ability of those skilled in the present art. For purposes of brevity, it is not discussed herein.

As can be seen from the above, the present invention provides an improved method and system for creating a patch file. While the present invention has been described in what is believed to be the most preferred forms, it is to be understood that the invention is not confined to the particular examples and arrangement of the components herein illustrated and described, but embraces such modified forms thereof as come within the scope of the appended claims.

What is claimed is:

1. A method of generating a patch file from an old version of computer code consisting of a series of elements and a new version of computer code consisting of a series of elements where both the old and new versions of computer code are stored in a memory and accessible by a data processor, the method comprising the steps of:

establishing an alphabet for processing the old and new versions of computer code where a word consists of one or more elements of the alphabet;

sorting the old version of computer code with the data processor alphabetically according to the established alphabet to create a first sorted list of code and maintaining a pointer for each element of the first sorted list of code indicating the element's original location in the old version of computer code;

sorting the new version of computer code with the data processor alphabetically according to the established alphabet to create a second sorted list of code and maintaining a pointer for each element of the second sorted list of code indicating the element's original location in the new version of computer code;

recursively comparing the first and second sorted lists of code one word at a time for a match of the codes, and storing the match of codes as a sequence of coinciding elements in a coincidences list;

upon finding a match of the codes, searching the first and second sorted lists of code again to find the largest sequence of coinciding elements preceding and succeeding the match of codes;

storing the largest sequence of coinciding elements in the coincidences list;

processing the coincidences list to remove duplicative coincidences; and creating a patch file from the processed coincidences list.

2. The method of claim 1, wherein the patch file includes a series of write commands.

3. The method of claim 2, wherein creating a patch file from the processed coincidences list includes the steps of:

(a) finding a largest block of coinciding elements of the processed coincidences list that matches the second sorted list of code and recording the location of the largest found block;

(b) in the area before the previously found block, finding the next largest block of coinciding elements of the processed coincidences list that matches the second sorted list of code and recording the location of the next largest found block;

(c) repeating step (b) until
      (i) the first member in the processed list of coincidences is reached; or
      (ii) there are no matches between the second sorted list of code and the processed coincidences list;

(d) writing a write from the old version of computer code command and offset and length information to the patch file if the first member of the processed list of coincidences is reached; and (e) writing a write from patch file command and length and patch information to the patch file when there is no match between the second sorted list of code and the processed coincidences list.

4. A system for generating a patch file from an old version of computer code consisting of a series of elements and a new version of computer code consisting of a series of elements, the system comprising:

a data processor;

a memory storing the old and new versions of computer code;

means for sorting the old version of computer code with the data processor alphabetically according to an established alphabet to create a first sorted list of code and for maintaining a pointer for each element of the first sorted list of code indicating the element's original location in the old version of computer code;

means for sorting the new version of computer code with the data processor alphabetically according to an established alphabet to create a second sorted list of code and for maintaining a pointer for each element of the second sorted list of code indicating the element's original location in the new version of computer code;

means for searching the first and second sorted lists of code to find a match of codes, the match of codes including a sequence of coinciding elements;

means for storing the sequence of coinciding elements in a coincidences list;

means for processing the coincidences list to remove duplicative coincidences therefrom; and means for creating a patch file from the processed coincidences list.

5. A system as in claim 4, wherein the means for creating a patch file includes:

means for finding the largest block of coinciding elements of the processed coincidences list that matches the second sorted list of code and recording the location of the largest found block of coinciding elements in a memory;

means for finding the next largest block of coinciding elements of the processed coincidences list that matches the second sorted list of code and recording the location of the next largest block of coinciding elements in the memory;

means for writing a write form the old version of computer code command and offset and length information to the patch file; and means for writing a write from patch file command and length and patch information to the patch file.

* * * * *